(12) United States Patent
Venugopal et al.

(10) Patent No.: US 11,262,918 B1
(45) Date of Patent: Mar. 1, 2022

(54) DATA STORAGE SYSTEM WITH UNEVEN DRIVE WEAR REDUCTION

(71) Applicant: Amazon Technologies, Inc., Seattle, WA (US)

(72) Inventors: Sriram Venugopal, Issaquah, WA (US); Vivek Ramchandra Kumkar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/039,872

(22) Filed: Sep. 30, 2020

(51) Int. Cl.
*G06F 3/06* (2006.01)
*G06F 11/30* (2006.01)
*G06F 11/34* (2006.01)

(52) U.S. Cl.
CPC .......... *G06F 3/0616* (2013.01); *G06F 3/0638* (2013.01); *G06F 3/0646* (2013.01); *G06F 3/0689* (2013.01); *G06F 11/3034* (2013.01); *G06F 11/34* (2013.01)

(58) Field of Classification Search
CPC .. G06F 3/0616; G06F 3/0689; G06F 11/3034; G06F 11/34; G06F 3/0646; G06F 3/0638
See application file for complete search history.

(56) References Cited

U.S. PATENT DOCUMENTS

| | | |
|---|---|---|
| 5,574,878 A | 11/1996 | Onodera et al. |
| 6,463,509 B1 | 10/2002 | Teoman et al. |
| 7,788,664 B1 | 8/2010 | Janakiraman et al. |
| 7,895,261 B2 | 2/2011 | Jones et al. |
| 8,280,853 B1 | 10/2012 | Lai et al. |
| 8,285,687 B2 | 10/2012 | Voll et al. |
| 8,688,660 B1 | 4/2014 | Sivasubramanian |
| 9,110,600 B1 | 8/2015 | Brooker |
| 9,246,996 B1 | 1/2016 | Brooker |

(Continued)

FOREIGN PATENT DOCUMENTS

WO  2011/088261  7/2011

OTHER PUBLICATIONS

"Amazon EBS API and Command Overview", downloaded Jul. 11, 2013 from doc.aws.amazon.com/AWSEC2/latest/UserGuidelebs-api-cli-overview.html, p. 1.

(Continued)

*Primary Examiner* — Masud K Khan
(74) *Attorney, Agent, or Firm* — Robert C. Kowert; Kowert, Hood, Munyon, Rankin & Goetzel, P.C.

(57) ABSTRACT

A data storage system includes multiple data storage devices. A subset of the data storage devices are selected to implement log storages for the data storage system, wherein incoming read and write requests are serviced at the data storage devices implementing the log storages. Data written to a volume stored in the data storage system is initially written to the log storage and subsequently flushed to additional data storage implemented using remaining ones of the data storage devices of the data storage system. A controller monitors wear levels of the data storage devices and initiates a reorganization of which data storage devices implement the log storages and which data storage devices implement the additional storage such that discrepancies in wear between the data storage devices is reduced.

20 Claims, 10 Drawing Sheets

(56) References Cited

U.S. PATENT DOCUMENTS

| | | | |
|---|---|---|---|
| 9,342,457 | B2 | 5/2016 | Wei et al. |
| 9,503,517 | B1 | 11/2016 | Brooker |
| 9,563,385 | B1 | 2/2017 | Kowalski et al. |
| 10,055,352 | B2 | 8/2018 | Wei et al. |
| 10,503,650 | B2 | 12/2019 | Wei et al. |
| 2002/0059253 | A1 | 5/2002 | Albazz et al. |
| 2003/0191930 | A1 | 10/2003 | Viljoen et al. |
| 2004/0078419 | A1 | 4/2004 | Ferrari et al. |
| 2008/0140905 | A1 | 6/2008 | Okuyama |
| 2009/0228889 | A1 | 9/2009 | Yoshida |
| 2009/0249470 | A1 | 10/2009 | Litvin et al. |
| 2009/0327602 | A1* | 12/2009 | Moore ............... G06F 3/0616 711/114 |
| 2010/0037009 | A1* | 2/2010 | Yano ................. G06F 3/0616 711/103 |
| 2010/0070725 | A1 | 3/2010 | Prahlad et al. |
| 2010/0191922 | A1 | 7/2010 | Dickey et al. |
| 2010/0312983 | A1 | 12/2010 | Moon et al. |
| 2011/0035548 | A1* | 2/2011 | Kimmel ............ G06F 16/1805 711/114 |
| 2012/0079221 | A1 | 3/2012 | Sivasubramanian et al. |
| 2012/0254687 | A1 | 10/2012 | Leggette et al. |
| 2013/0007753 | A1 | 1/2013 | Jain |
| 2013/0042056 | A1 | 2/2013 | Shats et al. |
| 2013/0046966 | A1 | 2/2013 | Chu et al. |
| 2013/0086585 | A1 | 4/2013 | Huang et al. |
| 2013/0104126 | A1 | 4/2013 | Padmanabhuni et al. |
| 2013/0166831 | A1* | 6/2013 | Atkisson ............ G06F 12/0802 711/103 |
| 2013/0198459 | A1 | 8/2013 | Joshi et al. |
| 2014/0181046 | A1 | 6/2014 | Pawar et al. |
| 2017/0286288 | A1* | 10/2017 | Higgins ............. G06F 11/1048 |
| 2018/0357173 | A1 | 12/2018 | Wei et al. |
| 2020/0110707 | A1 | 4/2020 | Wei et al. |
| 2021/0089226 | A1* | 3/2021 | Swaminathan ....... G06F 3/0649 |

OTHER PUBLICATIONS

"AMI Basics" downloaded Jul. 11, 2013 from doc.aws.amazon.com/AWSEC2/latest/UserGuide/ComponentsAMIs.html, p. 1-2.

"AWS Amazon Elastic Block Store (EBS)—Persistent Storage" downloaded Jul. 11, 2013 from aws.amazon.com/ebs/, pp. 1-4.

"Cloudiquity" Published Mar. 12, 2009, Amazon Web Services and Cloud, pp. 1-4.

"Feature Guide: Elastic Block Store: Articles & Tutorials: Amazon Web Services" downloaded Jul. 11, 2013 from aws.amazon.com/articles/1667, pp. 1-7.

VMware; Carl Waldspurger; Memory Resource Management in WMware ESX Server; pp. 1-24, Dec. 10, 2002.

HP; Chris Hyser et al.; Autonomic Virtual Machine Placement in the Data Center; pp. 1-10, Feb. 26, 2008; HP Laboratories.

SwinBrain. "Database Management System Introduction". Nov. 17, 2009. Also available at ittp://swinbrain.ict.swin.edu.au/wiki/Database_Management_Systems_Introduction.

Amazon S3 Storage Services Guide—Developer Guide (API Version Mar. 1, 2006 ). Can be accessed at <http://docs.aws.amazon.com/AmazonS3/latest/dev/Welcome.html>.

Reich et al. "VMTorrent: Scalable P2P Virtual Machine Streaming". Dec. 10-13, 2012.

U.S. Appl. No. 15/425,857, filed Feb. 6, 2017, Marcin Piotr Kowalski, et al.

U.S. Appl. No. 16/706,513, filed Dec. 6, 2019, Danny Wei et al.

* cited by examiner

```
┌─────────────────────────────────────────────────────────────────────┐
│ Perform the reorganization wherein data drives to implement the log │
│ storage and the additional storage for the volume are selected such │
│ that discrepancies in wear levels between the data drives are reduced│
│                              312                                     │
│                                                                      │
│        ┌──────────────────────────────────────────┐                 │
│        │ Determine wear levels of data drives of  │                 │
│        │         the data storage system          │                 │
│        │                  402                      │                 │
│        └──────────────────────────────────────────┘                 │
│                                                                      │
│  ┌────────────────────┐              ┌────────────────────┐         │
│  │ Select data drives │              │ Select data drive to│         │
│  │ with least amount  │              │ implement the log   │         │
│  │ of wear as compared│              │ storage for the    │         │
│  │ to other data      │              │ volume based on a  │         │
│  │ drives of the data │              │ drive rotation     │         │
│  │ storage system to  │              │ order              │         │
│  │ implement the log  │              │ 406                │         │
│  │ storage for the    │              └────────────────────┘         │
│  │ volume             │                                              │
│  │ 404                │                                              │
│  └────────────────────┘                                              │
│                                                                      │
│              ┌────────────────────────────┐                         │
│              │ Select data drive to       │                         │
│              │ implement the log storage  │                         │
│              │ at random from the data    │                         │
│              │ drives of the data storage │                         │
│              │ system not previously      │                         │
│              │ implementing the log       │                         │
│              │ storage for the volume     │                         │
│              │ 408                        │                         │
│              └────────────────────────────┘                         │
└─────────────────────────────────────────────────────────────────────┘

┌─────────────────────────────────────────────────────────────────────┐
│ Implement a new log storage for the volume using one or more data   │
│ drives of the data storage system selected as part of the           │
│ reorganization                                                       │
│                              314                                     │
└─────────────────────────────────────────────────────────────────────┘

┌─────────────────────────────────────────────────────────────────────┐
│ Implement additional storage for volume data flushed from the log   │
│ storage using remaining ones of the data drives of the data storage │
│ system selected as part of the reorganization                       │
│                              316                                     │
└─────────────────────────────────────────────────────────────────────┘
```

FIG. 4

DATA STORAGE SYSTEM WITH UNEVEN DRIVE WEAR REDUCTION

BACKGROUND

Advances in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. Such block-based storage may be implemented using one or more data storage systems that assigns storage devices of the data storage systems such as hard disk drives, non-volatile storage, etc. to store respective blocks of a volume.

BRIEF DESCRIPTION OF THE DRAWINGS

FIG. 4 illustrates additional details regarding how data drive assignments may be selected as part of performing a reorganization of data drives for a data storage system, according to some embodiments.

Figure 1:
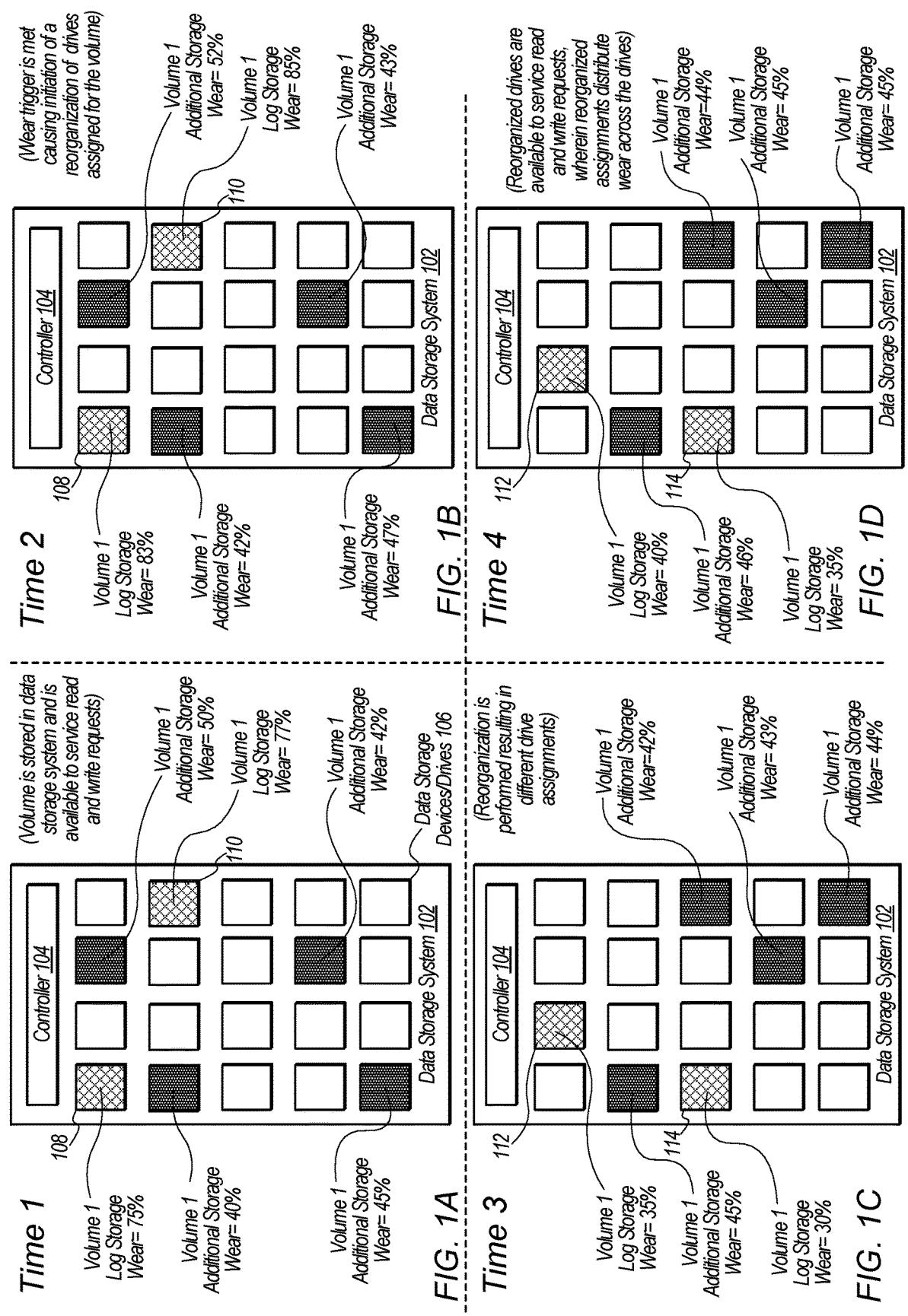
FIG. 1A illustrates a data storage system that supports uneven drive wear reduction at a first moment in time, wherein some drives of the data storage system have been assigned to function as log storage drives and other drives have been assigned to function as additional data storage drives, according to some embodiments.
FIG. 1B illustrates the data storage system that supports uneven drive wear reduction at a second moment in time, wherein differences in wear levels between the drives of the data storage system meet a triggering criteria causing a reorganization of drive assignments to be performed, according to some embodiments.
FIG. 1C illustrates the data storage system that supports uneven drive wear reduction at a third moment in time, wherein drive assignments have been reorganized such that drives with less wear have been assigned to function as log storage drives, according to some embodiments.
FIG. 1D illustrates the data storage system that supports uneven drive wear reduction at a fourth moment in time, wherein discrepancies in wear levels between the drives have been reduced by assigning drives with less wear to function as log storage drives, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Generally described, aspects of the present disclosure relate to implementing a wear tracking and/or wear reduction module for a data storage system to reduce discrepancies in wear between data storage devices (also referred to herein as drives or data drives) of the data storage system.

For example, a data storage system may include multiple data storage devices that physically are similar or interchangeable. As an example, a data storage system may include data storage devices comprising a set of interchangeable hard disk drives, a set of interchangeable solid state storage drives, such as NVME drives (non-volatile memory express), etc. A data storage service may include a number of such data storage systems. However, the data storage devices may be configured differently in order to provide different functions for the data storage system. The different functions and configurations of the data storage devices may result in uneven patterns of use of the data storage devices that cause some data storage devices of the data storage system to be used more frequently than other ones of the data storage devices of the data storage system. This uneven use may result in uneven wear patterns for the data storage devices of the data storage system. Accordingly, some of the data storage devices that are more heavily worn may fail after shorter durations in use than other ones of the data storage devices of the data storage system that are less heavily worn.

In one particular data storage system, two data storage devices are assigned to function as primary drives that host log storages while the remaining data storage devices function as data drives that store data flushed from the log storages. As used herein, flushing data refers to when the amount of data in the log drive reaches a certain level, a controller writes the log drive data to another drive, such as a set of the data storage devices functioning as data drives. The data storage system can be designed such that all reads and writes are serviced by the primary drives that host the log storages, and consequentially these drives wear faster than the remaining data drives that store flushed data. For example, a log drive may perform 10X or more the number of I/O operations that a data drive performs. In order to minimize this uneven wear pattern for the drives, a control plane (of the data storage service, or implemented locally on the data storage system) reorganizes the drive assignments by taking into account wear histories of the data storage devices. For example, less worn data storage devices may be assigned to function as primary drives that host a log storage during a rebuild/reorganization, whereas more worn data storage devices may be assigned to function as data drives that store flushed data. In some embodiments, a reorganization of the drive assignments may be triggered based on wear related triggers, such as wear deviations, or in other embodiments, a rebuild may be triggered for other reasons, such as a software update. However, regardless of the triggering event for the rebuild, the drive assignments may be performed in a smart manner, taking into account wear histories and selecting primary drives that host log storages in a way that reduces discrepancies in drive wear across the drives of the data storage system.

In some configurations of a data storage system, a single failed data storage device may require the data storage system to be taken offline to be repaired or replaced. In such configurations other ones of the data storage devices of the data storage system may be unavailable while the data storage system is offline. Also, the data storage system may host data for a number of different customers. In order to provide uninterrupted service to these customers, when the data storage system is taken offline, customer data stored in that data storage system may need to be transferred to a different data storage system of the data storage service, such that the customer can continue to access the customer data while the data storage system with the failed data storage device is offline. Because taking the data storage system with the failed data storage device offline makes all of the data storage devices of the data storage system unavailable for a period of time, the necessity of transferring data to the other data storage system may not be limited to just the data stored on the failed data storage device, but may instead apply to all or a substantial portion of the data stored on other non-failed ones of the data storage devices of the data storage system. In such situations, a non-trivial amount of storage space on the other data storage system of the data storage service may be required to store the transferred data while the data storage system with the failed data storage device is offline for replacement or repair. Also, in such situations a non-trivial amount of time and network bandwidth may be needed to transfer the data between the data storage systems.

As used herein, a server or drive of a data storage system "hosting" a volume refers to that storage device storing at least a portion (e.g., a partition, a set of blocks, recently logged data, or flushed data) of the data of the volume and implementing instructions for managing that portion of the volume (e.g., handling I/O to and from the volume, replication of the volume, transfer of volume data to and from other storage systems).

In some embodiments, reducing uneven wear amongst the data storage devices of a data storage system may reduce a frequency at which data storage devices of the data storage system fail. Also, reducing uneven wear amongst the data storage devices of a data storage system may reduce a frequency at which data needs to be transferred and stored to another data storage system in order for the data storage system to be taken offline for replacement or repair. By reducing such failures, less storage space of a data storage service may be used to store transferred data, transferred due to offline data storage systems. Also, by reducing such failures, less network bandwidth may be consumed transferring data between data storage systems of a data storage service due to offline data storage systems. Thus, both storage efficiencies and network efficiencies of a data storage service may be realized by reducing uneven wear amongst the data storage devices of the data storage systems of the data storage service.

Also, in some embodiments, techniques as described herein to reduce uneven wear amongst data storage devices of a data storage system may be applied to other components of a data storage system, such as compute components that implement a storage server for the data storage system. Additionally, in some embodiments, techniques as described herein to reduce uneven wear amongst data storage devices of a data storage system may be applied to other systems, such as compute resources of a virtualized computing service, etc.

Generally described, aspects of the present disclosure also relate to taking into account levels of wear of data storage devices of a data storage system when making initial drive assignments for the data storage devices of the data storage system and/or when assigning drives as part of a rebuild process.

Additionally, aspects of the present disclosure relate to preemptively initiating a rebuild of a data storage system in response to one or more wear triggers being met. For example, the wear triggers may include a deviation in wear levels of the data storage devices of the data storage system exceeding a threshold difference in wear, an accumulated amount of wear of a given data storage device exceeding an overall wear level threshold, a length of service of a data storage device serving as a log storage exceeding a service length threshold, a customer performance measurement falling below an acceptable threshold (such as an IO latency threshold), or other such triggers. In response to one or more of the wear triggers being met, the data storage system may perform a rebuild wherein drive assignments for the data storage devices of the data storage system are reorganized such that some data storage devices that previously hosted additional storage are assigned to host a log storage and some data storage devices that previously hosted log storage are assigned to host additional storage.

The drive assignments may be intelligently selected taking into account respective wear levels of the data storage devices of the data storage system such that discrepancies in wear levels between the data storage devices of the data storage system are reduced. For example, because data storage devices assigned to host log storages may be used more often and wear at a faster rate than data storage devices assigned to host additional storage, data storage devices with less wear relative to other ones of the data storage devices of the data storage system may be selected to be assigned to host the log storage. Also, data storage devices with more wear relative to other ones of the data storage devices of the data storage system may be excluded as candidates to host the log storage.

In some embodiments, a least worn data storage device or a set of least worn data storage devices of a data storage system may be selected to be assigned to host log storage. In other embodiments, a data storage device or set of data storage devices may be selected to be assigned to host the log storage at random from a set of candidate data storage devices. The set of candidate data storage devices may exclude data storage devices with a wear level above a given threshold from being considered as candidates to host the log storage. The set of candidate data storage devices may also exclude a data storage device or devices that previously hosted the log storage prior to the rebuild being initiated.

In some embodiments, the log storage may store snapshot information for volumes stored in the data storage system and also store metadata indicting how a given volume is broken down into partitions. Additionally, as explained in more detail in FIGS. 8A-8B, the log storage may store index data indicating where volume data for a volume or volume partition is stored in a log of the log storage or stored in the additional storage of the remaining data storage devices. For example volume data may initially be stored in a log of a log storage and subsequently be flushed from the log storage to the additional storage. The index of the log storage node may be updated to indicate the new storage location for the volume data when flushed.

In some embodiments, the log storage may function as a cache that stores newly written volume data to a log prior to the newly written volume data written to the log being flushed to the additional storage of the remaining data storage devices. Also, volume data requested in a read request may be read from a log of the log storage, if present or may be copied into a cache of the log storage from the additional storage as part of responding to a read request.

In some embodiments, a sub-set of the data storage devices of a data storage system may be configured to function as log storages, wherein a first log storage functions as a primary log storage or primary node and a second log storage functions as a reserve log storage/node or secondary log storage/node. Volume data may be replicated between the primary node and the reserve/secondary node. Also, the volume data may be flushed to a subset of the remaining data storage devices that function as additional storage of the data storage system. In some embodiments, multiple volumes may be stored in a data storage system, wherein the data storage devices configured to implement log storage provide log storage for the volumes stored in the data storage system. However, different subsets of the remaining data storage devices may store flushed data for the volumes. For example, in some embodiments, volume data flushed from a log storage to additional storage may be partitioned and stored across a set of remaining nodes, such as four or six remaining nodes, as an example. In some embodiments, volume data flushed from a log storage to additional storage may be stored in a striped pattern across all or a sub-set of the remaining nodes. Also, in some embodiments the flushed volume data may be erasure coded, wherein data partitions and parity partitions of the volume data are stored across different ones of the remaining nodes of the data storage system. In some embodiments, different sets of remaining nodes may be assigned to store flushed data for different volumes, but a same set of log storage nodes may be assigned to store index data for the different volumes. For example, the log storage nodes may be shared by all the volumes stored on the data storage system while different sets of remaining nodes may store different chunks of volume data for different ones of the volumes.

In some embodiments, a data storage system and/or a data storage service as described herein may be part of a block-based storage service that provides block-based storage volumes to compute instances of a virtualized computing service.

In general, a virtualized block storage volume (referred to in various implementations as a cloud disk, storage disk, cloud volume, disk, block volume, or simple "volume") can correspond to a logical collection of data, such as a set of data maintained on behalf of a user. The data of the volume may be erasure coded and/or replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas.

In some embodiments, receiving write requests from a client, causing write data to be replicated to secondary nodes, performing flush operations, responding to read requests from a client, etc. may be performed by a node designated as a primary node for a volume or volume partition. Note that a "node" as used herein may refer to a data drive or data storage device of a data storage system that implements uneven wear reduction, wherein the primary node implements a log storage for the volume or volume partition. A client may represent instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

In some embodiments, a controller of a data storage system may direct read operations and write operations received from clients to the data storage devices of the data storage system that are assigned to implement log storages. Additionally, or alternatively, routing addresses, such as public IP addresses, may be provided to the clients, wherein read operations and/or write operations are addressed by the client using the supplied routing addresses, and wherein the supplied routing addresses cause the read operations and/or write operations to be routed to the data storage devices assigned to implement log storages.

In order to provide high durability data storage and low latencies for accessing data, a data storage system may store data in local log storages of primary nodes that function as servers for the data storage system, replicate the data to other nodes of the data storage system, and also store the data across additional storage in multiple other nodes of the data storage system. Thus, a data storage system may provide low latency input/output operations (IOPs) for data stored in a log storage of a primary node, while still providing data durability due to the data being replicated to another log storage of one or more other nodes. Furthermore, the data storage system may provide equivalent or higher durability for the data once the data is flushed and stored in additional storage in multiple other nodes of the data storage system. Thus, a data storage system may provide high levels of data durability and low input/output operation latency for data stored in a log storage of a primary node and replicated to one or more other nodes and for data stored in additional storage in multiple remaining nodes of the data storage system.

In some embodiments, data may be initially stored in a storage of a primary node and replicated to a storage of one, two, or more other reserve or secondary nodes, and may be asynchronously copied to additional storage implemented using multiple other nodes of the data storage system that form a RAID array (random array of independent disks) to store the data. In some embodiments, recently stored data or frequently accessed data may remain in a log storage of a primary node to allow for low latency access to the data. The data may then be flushed to additional storage in multiple different other nodes of the data storage system after a certain amount of time has elapsed since the data was last accessed or stored. Flushing the data to the additional storage may maintain or increase a durability of the data as compared to the data being stored in a storage of a primary node and being replicated to a storage of one, two, or more secondary/reserve nodes. In some embodiments, other criteria may be used to determine when data stored in a storage of a primary node is to be flushed to additional storage implemented using other nodes of the data storage system. For example, data may be collected in a log of a primary node and upon an amount of data being stored in the log exceeding a threshold amount, the data may be relocated to additional storage implemented across multiple other nodes of the data storage system.

In some embodiments, a data storage system may include several interchangeable nodes (e.g. storage devices/data drives) that may be assigned to implement a log storage or an additional storage. The data storage system may also include at least two networking devices. The data storage system may further include connectors for coupling the data storage system with at least two separate power sources. The data storage system may also include at least two power distribution systems within the data storage system to provide redundant power to the nodes and the networking devices of the data storage system. Furthermore, the at least two networking devices of the data storage system may implement at least two redundant networks within the data storage system that enable communications between the nodes of the data storage system. Furthermore, the at least two networking devices of the data storage system may implement at least two redundant networks within the data storage system that enable communications between the primary nodes of the data storage system and external clients of the data storage system. In some embodiments, a data storage system that includes redundant networks and redundant power may provide high reliability and data durability for data storage and access.

In some embodiments, a data storage system may include one or more primary nodes that are assigned network addresses that are routable from devices external to the data storage system. Thus, external clients may communicate directly with primary nodes of a data storage system without the communications being routed through a control plane of the data storage system, such as a zonal control plane. Also, a data storage service that includes multiple data storage systems may implement a zonal control plane that assigns volumes or volume partitions to particular ones of the data storage systems. Also, a zonal control plane may coordinate operations between data storage systems, such as rebalancing loads by moving volumes between data storage systems. However, a data storage system may also implement a local control plane configured to perform fail over operations for primary and reserve nodes and remaining nodes that implement additional storage.

The traffic and operations of a cloud provider network, such as that may include a data storage service comprising data storage units that support uneven drive wear reduction, may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIGS. 1A-1D illustrates a data storage system 102 that includes data storage devices/drives 106 and controller 104. The data storage devices 106 may physically be interchangeable data storage devices, such as hard disk drives or NVME drives, etc. However, for a given build of the data storage system 102 some of the data storage devices 106 may be configured to implement log storage, while remaining ones of the data storage devices are configured to implement additional storage. For example, in FIG. 1A at times 1 and 2 data storage devices 108 and 110 are assigned to implement log storages for the data storage system 102 and at times 3 and 4 data storage devices 112 and 114 are assigned to implement log storages for the data storage system 102. Also, for a given build of a data storage system remaining ones of the data storage devices not selected to implement log storage may be configured to implement additional storage. As explained above, volume data may initially be stored in a log of a log storage and then subsequently be flushed to additional storage implemented using a subset of the remaining data storage devices.

While all or a substantial portion of the remaining data storage devices may store flushed volume data for volumes stored in the data storage system, for a given volume only a subset of the remaining data storage devices may store data flushed as part of a particular flush operation. Though sequential sets of volume data flushed in sequential flushes for a same volume may be stored on different subsets of the remaining data storage devices. In some embodiments, the flushed data may be stored in a random array of independent disks (RAID) configuration when flushed to the additional storage implemented using the remaining data storage devices of the data storage system. Also, the flushed data may be erasure coded and stored as data partitions and parity partitions in the additional storage using different ones of the remaining data storage devices of the data storage system.

However, since reads and writes for volumes stored in the data storage system are serviced by the same set of data storage devices implementing the log storage, such as storage devices 108 and 110 at times 1 and 2 and storage devices 112 and 114 at times 3 and 4, the storage devices implementing the log storages may be utilized more frequently than the remaining data storage devices and may wear more quickly. Note that because flushed volume data for volumes stored on the data storage system is distributed amongst a larger number of remaining nodes, any given remaining node may only need to be written to, or read from, when a chunk assigned to that particular remaining node is involved in a flush or read, whereas writes and reads for all volumes stored on the data storage system utilize the log storage.

FIG. 1A illustrates data storage system 102 that supports uneven drive wear reduction at a first moment in time. For a given volume, such as volume 1, data storage devices 108 and 110 may function as log storages. Also, flushed data for the volume 1 may be flushed to any one of the remaining data storage devices 106. As illustrated in FIG. 1A the volume data has been flushed to a subset of the remaining data storage devices 106 including the four darkly shaded remaining data storage devices 106. As can be seen in FIG. 1A the data storage devices 108 and 110 that implement the log storage may be more worn than the remaining data storage devices that implement the additional storage for volume 1. For example, data storage device 108 is worn to 75% and data storage device 110 is worn to 77%, while the remaining nodes storing flushed volume data for volume 1 are worn to 40%, 45%, 42%, and 50%.

In some embodiments, such wear patterns may be approaching a trigger for a reorganization of the drives of data storage system 102. For example, a wear trigger may state that a reorganization is to be initiated if wear deviations between the most worn data storage devices and the least worn data storage devices exceeds 40% (as an example, other thresholds may be used). Also, a wear trigger may state that a reorganization is to initiated if a wear level of any data storage device exceeds a total wear level threshold, such as 80% (as an example, other thresholds may be used). Also, other wear triggers may state that if a number of input/output (I/O) operations performed by a data storage device configured as a log storage exceeds a service threshold, a reorganization is to be initiated. In the example shown in FIG. 1A, the deviation between the most worn drive (77%) and the least worn drive (40%) may be approaching a wear trigger. Also, the most worn drive (77%) may be approaching a wear trigger based on total wear.

FIG. 1B illustrates the data storage system that supports uneven drive wear reduction at a second moment in time, wherein differences in wear levels between the drives of the data storage system meet a triggering criteria causing a reorganization of drive assignments to be performed, according to some embodiments.

For example in FIG. 1B at time 2, the deviation between the most worn drive (85%) and the least worn drive (42%) may have met a wear trigger, e.g. deviation greater than 40%, as an example (other thresholds may be used). Also, the most worn drive (85%) may meet a wear trigger based on total wear, e.g. total wear greater than 80%, as an example (other thresholds may be used). Also the wear level of data storage device 110 may exceed a total wear trigger (e.g. 83% is greater than the example 80% threshold). These wear patterns may cause a controller such as controller 104 to initiate a reorganization/rebuild of the data storage system 102.

FIG. 1C illustrates the data storage system that supports uneven drive wear reduction at a third moment in time, wherein drive assignments have been reorganized such that drives with less wear have been assigned to function as log storage drives, according to some embodiments.

For example, subsequent to the reorganization/rebuild data storage devices 112 and 114 may be assigned as log storages for data storage system 102, and may have respective wear levels of 30% and 35%. Also remaining data storage devices assigned to implement additional storage for volume 1 may have wear levels of 45%, 42%, 43%, and 44%. Thus all of the assigned data storage devices may have wear levels less than the total wear threshold, such as 80% used in the example above. Also, the deviation between the most worn data storage device and the least worn data storage device may be less than the deviation threshold, such as 40% used in the example above. For example the most worn data storage device at time 3 has a wear level of 45% and the least worn data storage device at time 3 has a wear level of 30%, so that the deviation in wear levels at time 3 is 15%, which is less than the deviation threshold.

FIG. 1D illustrates the data storage system that supports uneven drive wear reduction at a fourth moment in time, wherein discrepancies in wear levels between the drives have been reduced by assigning drives with less wear to function as log storage drives, according to some embodiments.

Because the log storages are implemented on data storage devices with less wear as compared to the other data storage devices as part of the rebuild, at time 4 (after the data storage system has been in service for a period of time subsequent to the rebuild at time 3), the deviations in wear levels between the data storage devices are further reduced. This is because the data storage devices assigned to implement the log storage are used more frequently and wear faster than the data storage devices assigned to implement the additional storage. Thus, at time 4, the deviation in wear is 11% (e.g. 46% minus 35%).

Figure 2:
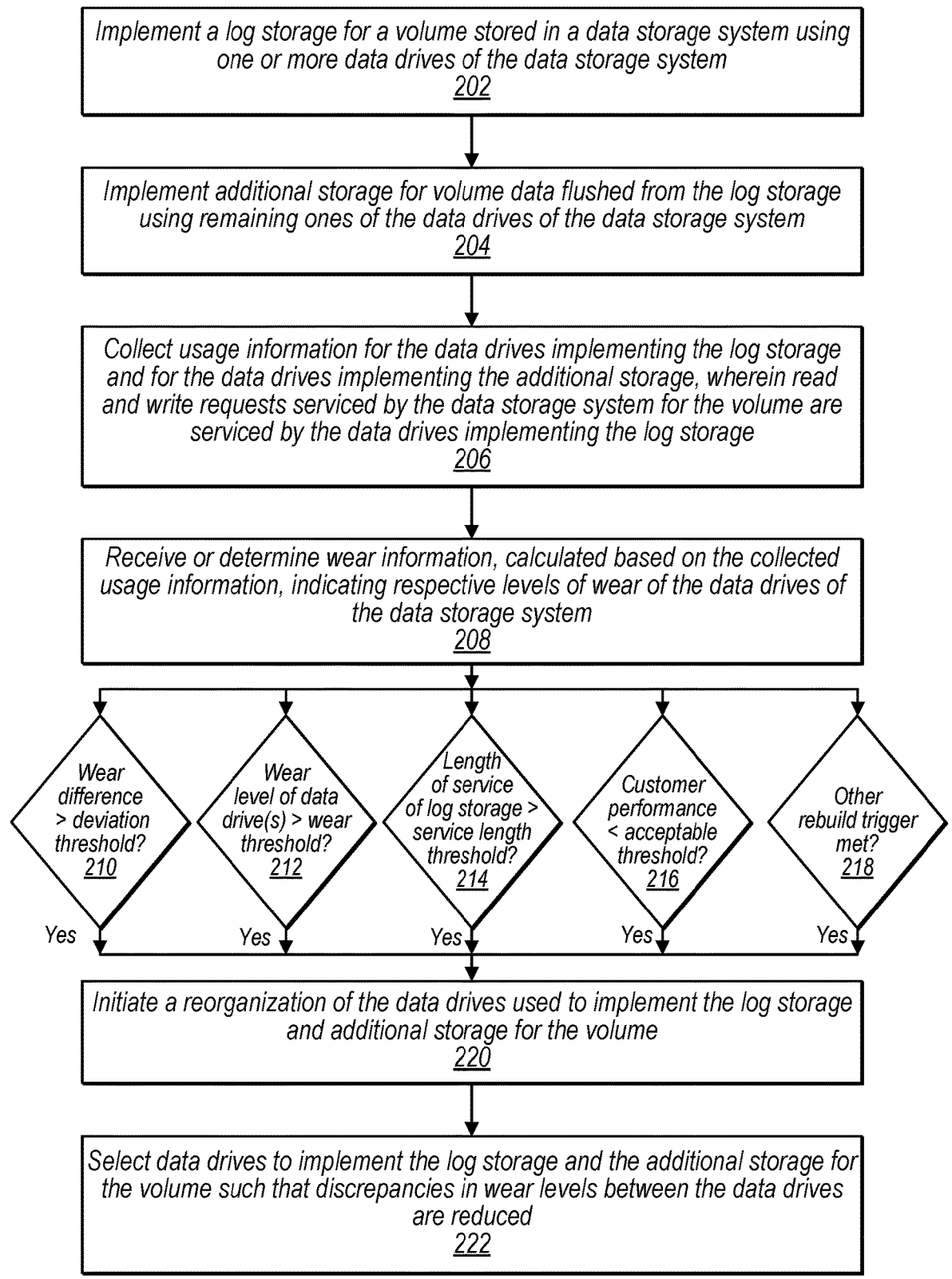
FIG. 2 illustrates a process for assigning log storage drives and additional data storage drives for a volume and triggering a reorganization of the assignments if one or more triggers is met, according to some embodiments.

FIG. 2 illustrates a process for assigning log storage drives and additional data storage drives for a volume and triggering a reorganization of the assignments if one or more triggers is met, according to some embodiments.

At 202, a controller for a data storage system implements a log storage for a volume stored in a data storage system using one or more data storage devices of the data storage system. The data storage devices used to implement the log storage may be selected based on wear levels as part of an initial placement. Also wear levels may be used to select data storage devices to implement log storage for subsequent rebuilds/reorganizations of the data storage system. In some embodiments, a data storage service control plane, such as data storage service control plane 606 illustrated in FIG. 6 may determine initial placement of a volume in a given data storage system of a data storage service and may take into account wear levels of log storages of the respective data storage systems when placing the volume.

At 204, the controller for the data storage system implements additional storage for a volume stored on the data storage system using remaining ones of the data storage devices of the data storage system. The additional storage may store volume data flushed from the log storage.

At 206, hardware monitoring modules implemented on the data storage system collect usage information for the data storage devices implementing the log storage and the additional storage, wherein read and write requests serviced by the data storage system for the volume are serviced by the data storage devices implementing the log storage. In some embodiments, the usage information may include input/output (I/O) patterns, operation counts, etc. that have been performed by the respective data storage devices. In some embodiments, the collected usage information may be provided to a health monitoring service that collects, stores, and/or analyzes health information for clients of the health monitoring service, such as health monitoring service 608 illustrated in FIG. 6. Also, in some embodiments, a data storage service control plane and/or a data storage system controller, such as data storage service control plane 606 or controller 104 may implement a wear tracking module and the collected usage information may be provided to the wear tracking module.

At 208, the controller for the data storage system may receive or determine (e.g. from a health monitoring service or by a wear tracking module) wear information for the data storage devices of the data storage system. The wear information may be calculated using the provided usage information and may indicate respective wear levels of the data storage devices of the data storage system.

In some embodiments, a rebuild/reorganization may be triggered based on the wear information. Elements 210, 212, 214, 216, and 218 illustrate example triggers. Though in some embodiments other triggers may be used.

Trigger 210 states that if a wear difference between a most worn data storage device and a least worn data storage device is greater than a deviation threshold amount, then a rebuild is to be triggered.

Trigger 212 states that if a wear level of a data storage device serving as a log storage is greater than a wear threshold, then a rebuild is to be triggered. For example, for a data storage device that is heavily worn and acting as a log storage, re-assigning the data storage device to function as additional storage may slow a rate of wear of the data storage device and delay or avoid a failure of the data storage device.

Trigger 214, states that if a data storage device serving as a log storage has been serving in that role for more than a threshold length of service than a rebuild should be triggered. In some embodiments, the length of service may be measured in number of operations performed and/or time.

Trigger 216 states that if a customer performance metric is less than an acceptable threshold than a rebuild should be performed. For example, if a data storage device serving as a log storage has a write latency less than a threshold latency, a rebuild may be initiated and the slow write latency data storage device may be reassigned to function as additional storage. Because flushes to the additional storage are performed asynchronously, the slower data storage device may not negatively affect write latencies when reassigned to additional storage.

At 218, other events may trigger a rebuild of a data storage system such as a software update, movement to a new rack, a manual trigger, etc. During such events, a controller may take advantage of the opportunity to intelligently assign data storage devices to function as log storages and additional storage such that discrepancies in wear levels between the data storage devices are reduced.

At 220, in response to one or more of the triggers 210 through 218 being met, the controller initiates a reorganization of the data storage devices used to implement the log storages and additional storages of the data storage system. In some embodiments, the reorganization may be part of a larger rebuild process that also installs software updates and performs other updates and tests on the data storage system.

At 222, as part of performing the reorganization data storage devices are selected to implement the log storage and the additional storage for the data storage system, wherein the selections take into account wear levels of the data storage devices. The selections are performed such that discrepancies in wear levels between the data storage devices are reduced.

Figure 3:
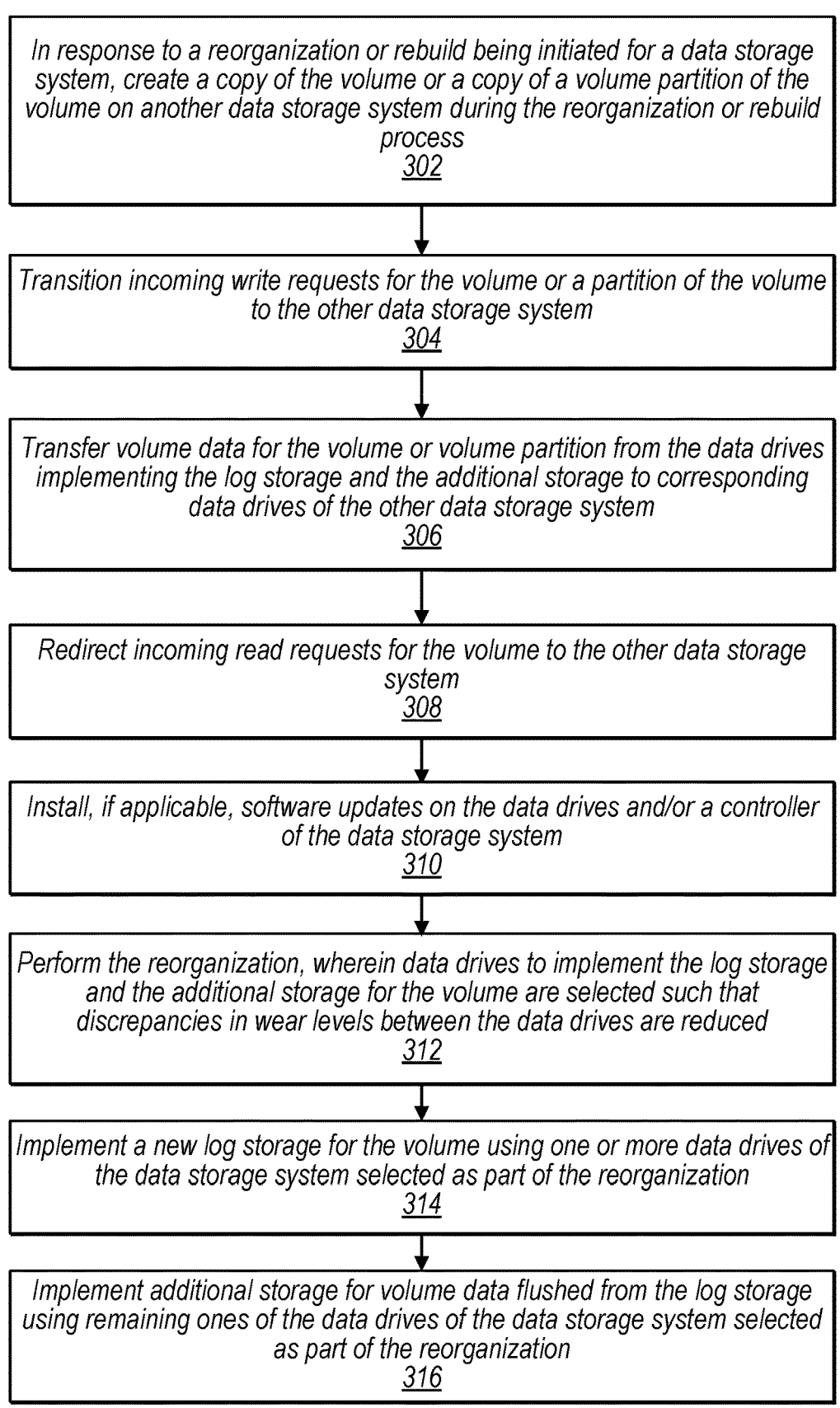
FIG. 3 illustrates a process for performing a rebuild and/or reorganization of data drives of a data storage system, according to some embodiments.

FIG. 3 illustrates a process for performing a rebuild and/or reorganization of data drives of a data storage system, according to some embodiments.

At 302, in response to a reorganization or rebuild being initiated for a data storage system, a control plane create a copy of the volume or a copy of a volume partition of the volume on another data storage system during the reorganization or rebuild process.

At 304, the control plane transitions incoming write requests for the volume or a partition of the volume to the other data storage system. Various transition schemes may be used to transition writes to the copy of the volume stored on the other data storage system. For example, in some embodiments a quiescence protocol may be used that redirects writes to the copy on the other data storage system. Also, in some embodiments writes may be made to both the version stored on the data storage system and the copy that is being created on the other data storage system. Once the transition to the copy is complete, writes then may then be redirected to the copy stored on the other data storage system. However, while the transition to the copy is being processed, writes may continue to be accepted at the version of the volume or volume partition stored at the data storage system and reads may continue to be performed using the version of the volume or volume partition stored on the data storage system. This may continue until the transition process is complete and reads are redirected to the copy stored on the other data storage system (e.g. at 308).

At 306, the control plane transfers volume data for the volume or volume partition from the data drives implementing the log storage and the additional storage to corresponding data drives of the other data storage system.

At 308, the control plane redirects incoming read requests for the volume to the other data storage system.

At 310, a controller of the data storage system and/or the control plane causes software updates to be installed on the data storage system if applicable.

At 312, the controller of the data storage system performs the reorganization, wherein data storage devices selected to implement the log storage and the additional storage for the volume are selected such that discrepancies in wear levels between the data storage devices are reduced.

At 314, the controller implements one or more new log storages for the volume using one or more data storage devices of the data storage system selected as part of the reorganization.

At 316, the controller implements additional storage for volume data flushed from the log storage using remaining ones of the data storage devices of the data storage system selected as part of the reorganization.

FIG. 4 illustrates additional details regarding how data drive assignments may be selected as part of performing a reorganization of data drives for a data storage system, according to some embodiments.

In some embodiments, selection of data storage devices to implement the log storage as part of the reorganization may be based on different criteria.

For example, as part of performing a reorganization, at 402, the controller determines respective wear levels of the data storage devices of the data storage system. For example, as shown in FIGS. 1A-1D.

In some embodiments, at 404 the controller may select data storage devices with a least amount of wear to implement the log storages.

In some embodiments, at 406 the controller may select data storage devices to implement the log storages according to a rotation order.

In some embodiments, at 408, the controller may select data storage devices to implement the log storages at random from a pool of candidate data storage devices that are not worn more than a threshold amount and/or have not previously or immediately preceding the rebuild served as log storages.

At 314 and 316 the log storage and additional storage may be implemented according to the selections made at 312.

Figure 5:
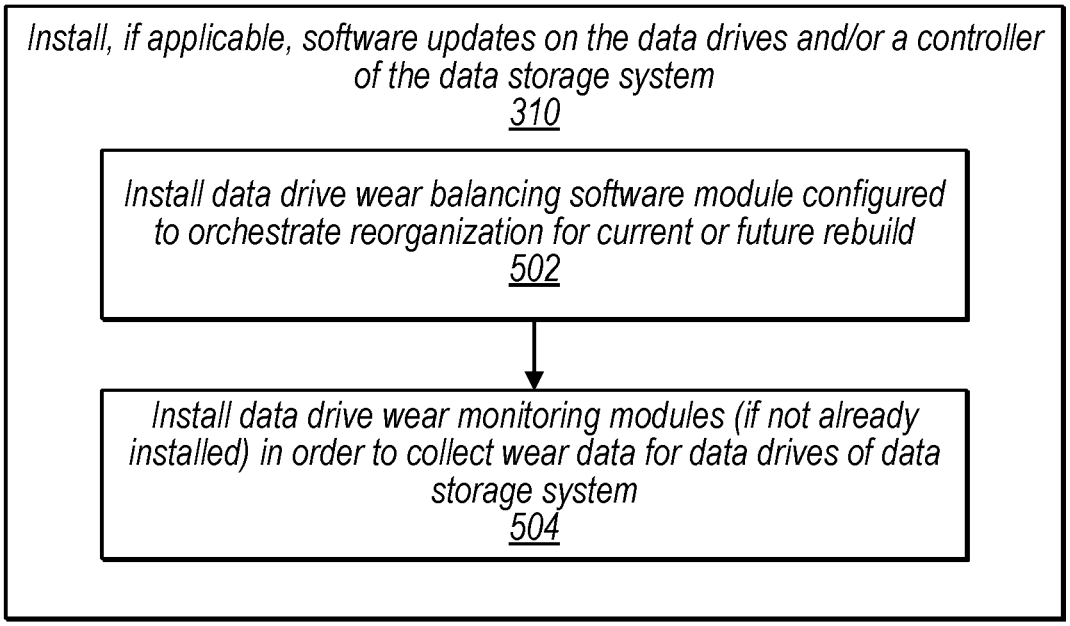
FIG. 5 illustrates additional details regarding how an existing data storage system may be upgraded to support uneven drive wear reduction as part of performing a rebuild of the data storage system, according to some embodiments.

FIG. 5 illustrates additional details regarding how an existing data storage system may be upgraded to support uneven drive wear reduction as part of performing a rebuild of the data storage system, according to some embodiments.

In some embodiments software modules for implementing uneven drive wear reduction may be installed as software updates installed during a rebuild process. For example as part of step 312 steps 502 and 504 may be performed.

At 502, data drive wear balancing software is installed on a controller of a data storage system in order to orchestrate reorganization for current or future rebuild.

At 504, if not already installed, data storage device wear monitoring module(s) are installed in order to collect wear data for data storage devices of the data storage system.

Figure 6:
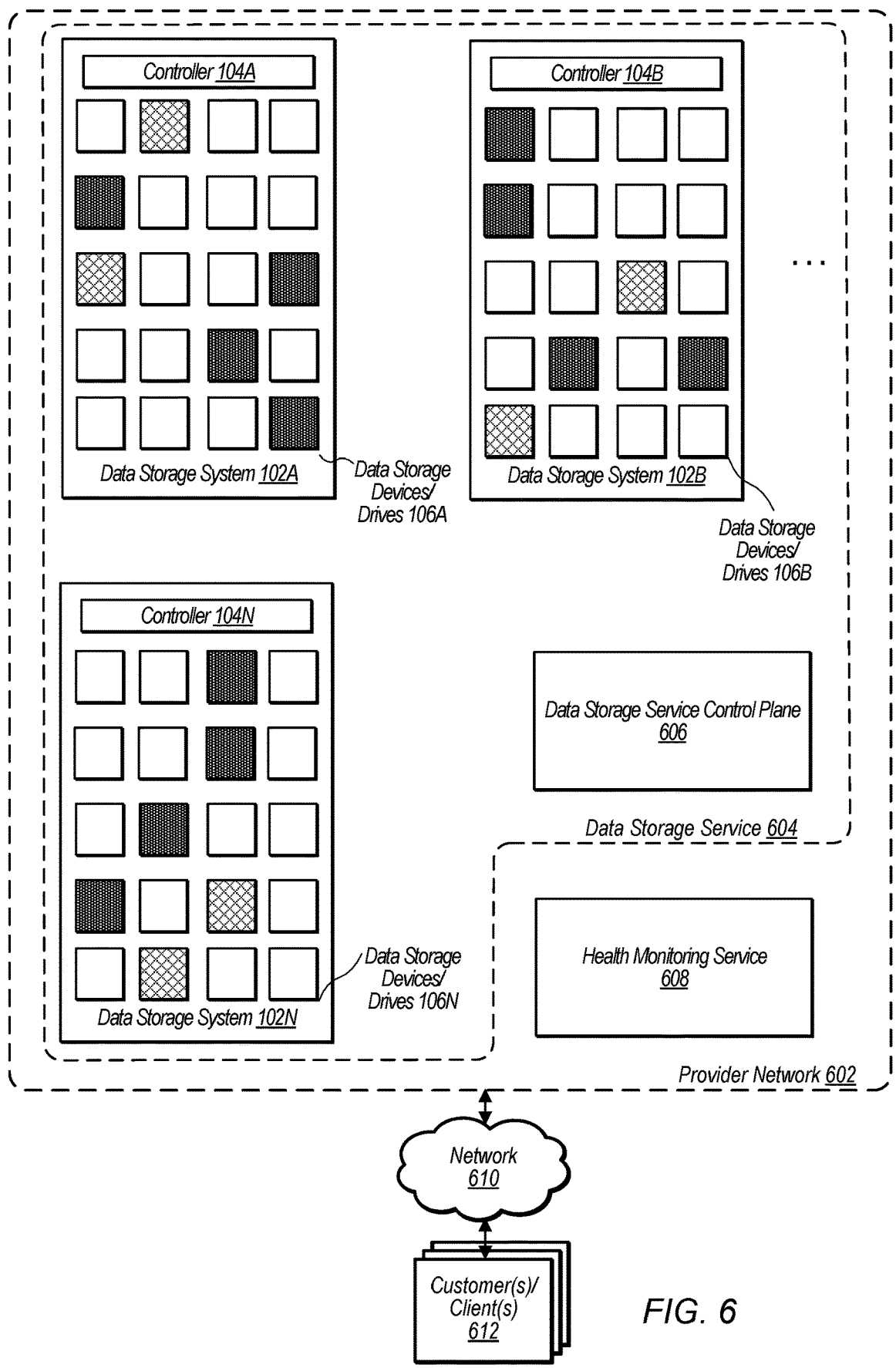
FIG. 6 illustrates a data storage service comprising data storage systems that support uneven drive wear reduction, wherein the data storage service is included as a service of a provider network that also includes a health monitoring service, according to some embodiments.

FIG. 6 illustrates a data storage service comprising data storage systems that support uneven drive wear reduction, wherein the data storage service is included as a service of a provider network that also includes a health monitoring service, according to some embodiments.

As discussed above, in some embodiments, a data storage service, such as data storage service 604, may be included in a provider network, such as provider network 602. The data storage service 604 (referred to in various implementations as an elastic block store service, a cloud disks service, a managed disk service, a storage area network service, a persistent disk service, or a block volumes service) may include multiple data storage systems 102A through 102N, such as the data storage system 102 described in regard to FIGS. 1-5. Also, as can been seen in FIG. 6, each of the data storage systems 102A through 102N may independently assign log storage and additional storage and may independently perform rebuilds when a wear trigger is met. Also data storage service 604 includes data storage service control plane 606 which may coordinate transferring volume data between data storage systems and/or redirecting reads and writes when a rebuild is being performed. Additionally, in some embodiments uneven drive wear reduction functionality as described herein may be implemented in a controller 104 of a data storage system 102, in data storage service control plane 606, or some combination thereof.

Figure 9:
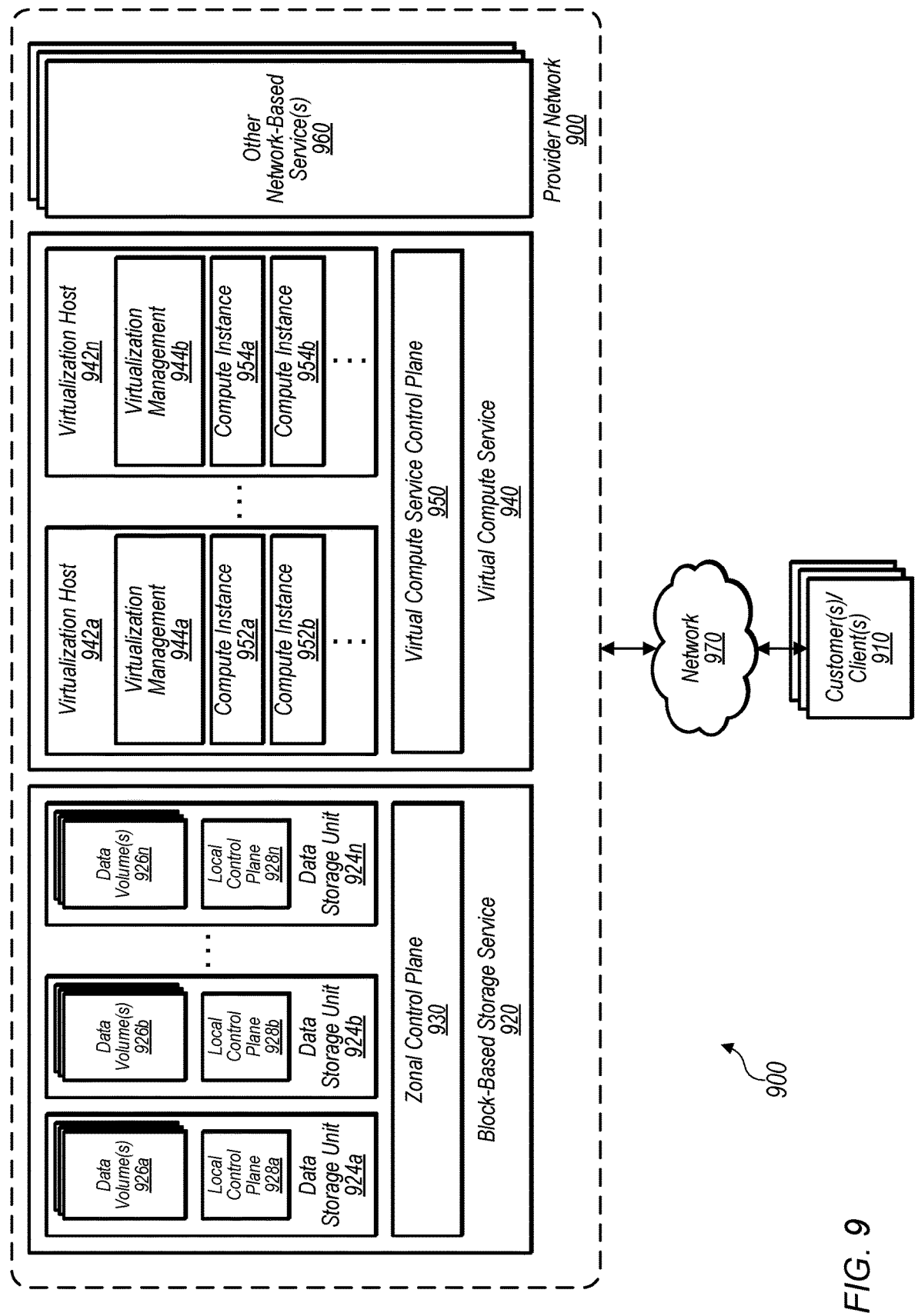
FIG. 9 is a block diagram illustrating a provider network implementing multiple network-based services including a block-based storage service that includes data storage systems that support uneven drive wear reduction, according to some embodiments.

Also in some embodiments, a provider network, such as provider network 602 may offer other services to clients of the provider network, as described in more detail in FIG. 9. In some embodiments, one such service may be a health monitoring service, such as health monitoring service 608. In some embodiments, hardware monitoring modules installed in respective ones of data storage systems 102A through 102N may collect usage information and provide the usage information to health monitoring service 608. Health monitoring service 608 may store the provided usage information and may use the stored usage information to calculate wear information that is then provided back to the data storage service control plane 606 and/or controller 104 for use in determining whether or not a wear trigger has been met and also for use in selecting drive assignments as part of a reorganization or rebuild.

Figure 7:
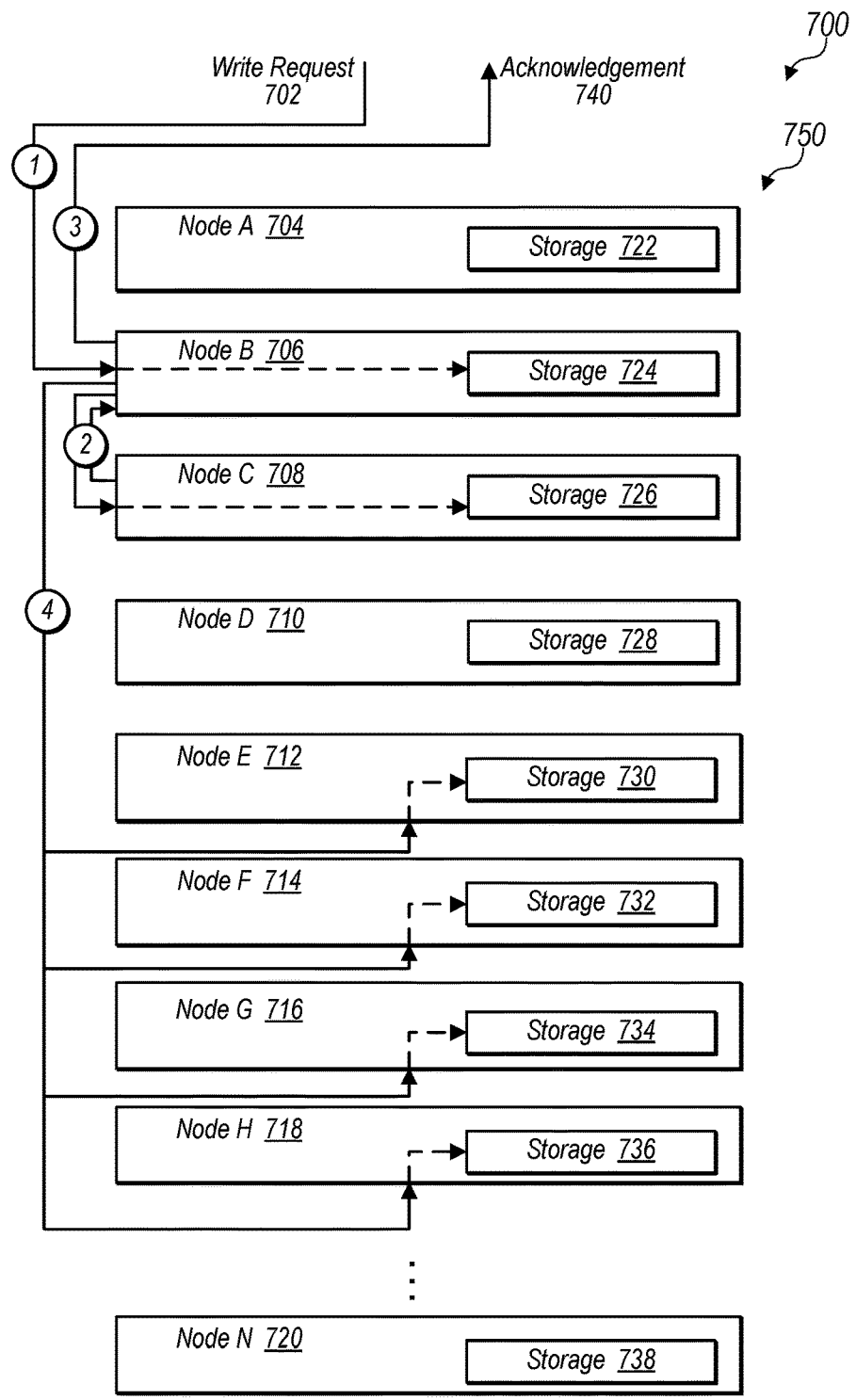
FIG. 7 is a block diagram illustrating drives of a data storage system that supports uneven drive wear reduction storing write data in log storage and flushing the write data to additional storages of the data storage system, according to some embodiments.

FIG. 7 is a block diagram illustrating nodes (e.g. data storage devices/data drives) of a data storage system that supports uneven drive wear reduction storing block storage data in response to a write request, according to some embodiments. Nodes A-N may be the same or similar to data drives/data storage devices illustrates in FIGS. 1A-1D. Also data storage unit 750 of data storage service 700 may be a similar data storage unit/system as data storage system 102 illustrated in FIGS. 1A-1D. Additionally, data storage service 700 may be a data storage service such as data storage service 604 illustrated in FIG. 6 or block-based storage service 920 illustrated in FIG. 9.

As discussed above, a data storage system that supports uneven drive wear reduction, may store volume data in a data storage of a first node designated as a primary node for a volume or volume partition and may also replicate the volume data to one or more additional nodes designated as reserve nodes for the volume or volume partition, wherein the primary node and the reserve node(s) implement log storages for the volume. For example, at time 1, a write request 702 is routed to node 706 that is designated as a primary node for a volume or volume partition. At time 2 subsequent to the write request being received at node 706, data included with the write request is stored in log storage 724 of primary node 706 and primary node 706 causes the data included with the write request to be replicated to log storage 726 of reserve node 708. Replication of the data to reserve node 708 is performed concurrently or nearly concurrently with storing the data in storage 724 of primary node 706. Also, as shown in FIG. 7 at time 2, replication of the data to the reserve node may include the reserve node sending an acknowledgment back to the primary node indicating that the data has been replicated to the reserve node. Subsequently at time 3, which is also nearly concurrent with the data being stored in the storage of the primary node and the data being replicated to the reserve node, the primary node, node 706, may issue an acknowledgement 740 to the client device that requested write 702 has been committed in data storage service 700.

In some embodiments, a write request, such as write request 702, may be concurrently received at a primary node and a reserve node. In such embodiments, the primary node may verify that the reserve node has committed the write before acknowledging at time 3 that the write has been committed in the data storage system.

At a later point in time 4, e.g. asynchronous to times 1-3, the primary node, e.g. node 706, may cause data stored in storage 724, that includes the data included with the write request and that may include additional data stored before or after the write request, to be flushed to additional storage implemented on remaining nodes of the data storage unit 750. For example, at time 4 data is flushed to storage 730 of node 712, storage 732 of node 714, storage 734 of node 716, and storage 736 of node 718. Note that whereas storage 724 of primary node 706 and storage 726 of reserve node 708 are organized as log storages, the storages 730, 732, 734, and 736 of remaining nodes 712, 714, 716, and 718 may be organized as general storage, wherein an index of the primary node storage 724 and/or an index of the reserve node storage 726 stores metadata indicating where the volume data for respective volumes is stored in the additional storage of the remaining nodes, such as the storages 730, 732, 734, and 736 of remaining nodes 712, 714, 716, and 718. However, physically, nodes 704 through 720 may be interchangeable, such that a primary node that implements a log storage may be re-assigned as a remaining node that implements additional storage and vice versa. For example respective ones of remaining nodes 712, 714, 716, and 718 may be re-assigned as primary nodes that implement a log storage as part of performing a rebuild or reorganization of data storage unit 750.

Because for a particular volume, the volume's data may be stored in a storage of a primary node and replicated to one or more reserve nodes and may later be moved to being stored across additional storage of remaining nodes, metadata comprising an index with pointers to where the data is stored may be used for subsequent read requests and write requests to locate the data. Also in some embodiments, a storage of a primary node or reserve node may be log-structured such that incoming write request are written to the head of the log of the node's log-structured storage. An index entry may be added indicating where the written data is stored in the node's log and subsequently the index may be updated when the written data is flushed from the log of the primary node to additional storage implemented using reaming nodes of the data storage system.

In some embodiments, replication to the reserve node(s) may be performed synchronously with a write, whereas flushing of stored data, such as write data, from a primary node to additional storage of remaining nodes of the data storage system may be performed asynchronously with a write or a set of writes. For example, a replicated write to node 708 from primary node 706 may be performed synchronously with servicing write request 702 and prior to sending acknowledgment 740. Also, for example, flushing of data to remaining nodes 712, 714, 716, and 718 (performed at time 4) may be performed asynchronously with servicing write request 702 and after sending acknowledgment 740.

In some embodiments, a replicated write, replicated from a primary node to a reserve node, may include a current sequence number for the nodes of a group of nodes designated as primary or reserve nodes for a particular volume partition to which the write is directed. In some embodiments, a reserve node may store a greatest sequence number yet seen for the particular volume partition and may decline to perform a replicated write if a sequence number appended to a replicated write is inferior to a sequence number stored by the reserve node for the particular volume partition.

Figure 8A:
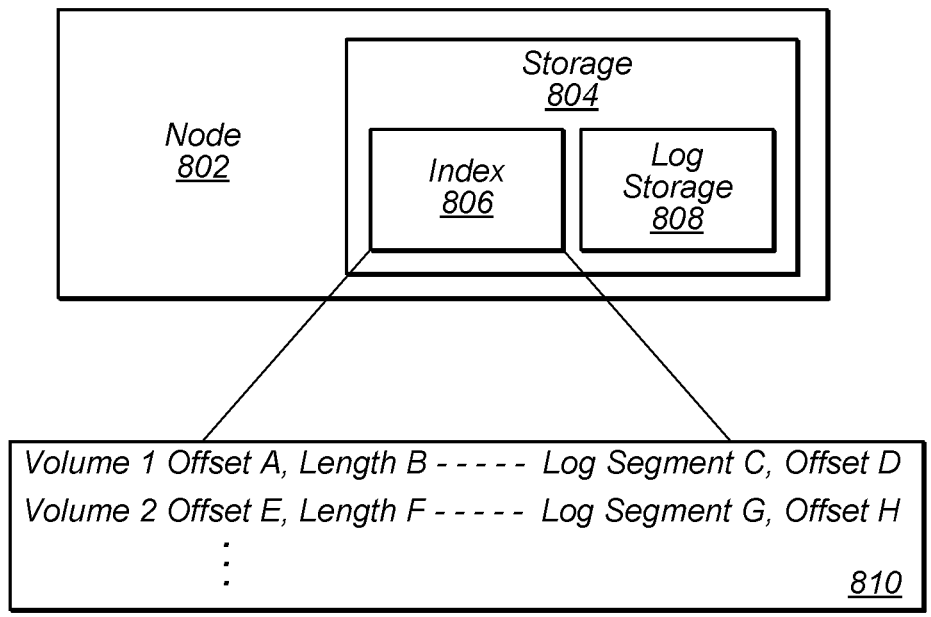
FIGS. 8A-8B are block diagrams illustrating a log storage and index of a data drive of a data storage system that supports uneven drive wear reduction, according to some embodiments.
Figure 8B:
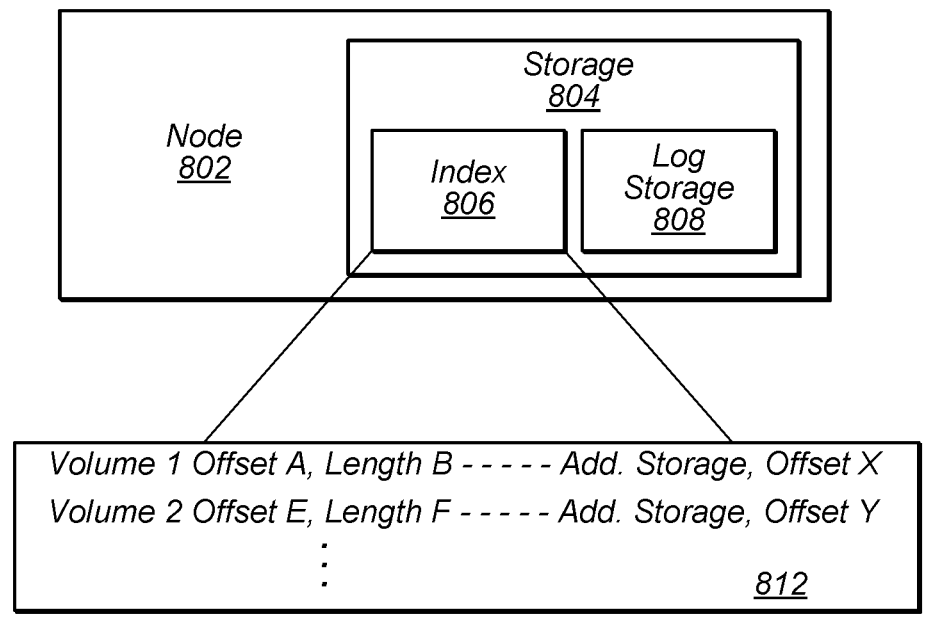

FIGS. 8A-8B are block diagrams illustrating a log-structured storage and an index of a node storage, according to some embodiments. For example, a node assigned to function as a primary node may implement log-structured storage and index as shown in FIGS. 8A and 8B.

Node 802 includes storage 804 that includes log 808 and index 806. Volume data may be stored in log 808 prior to being flushed to additional storage implemented using remaining nodes of a data storage system. Index information 810 may include an entry for the volume data and a corresponding pointer to where the volume data is stored. For example, index information 810 indicates that data for volume 1, offset A, length B is stored in log storage 808 at log segment C and offset D. In some embodiments, a log of a node such as log 808 of storage 804 of node 802 may store data for more than one volume. For example, index information 810 also includes an entry for volume 2 offset E, length F and a corresponding pointer indicating the data for this volume entry is stored in log 808 at log segment G, offset H.

While FIGS. 8A-8B illustrate log storage 808 and index 806 as separate from each other, in some embodiments, an index, such as index 806, may lay on top of a log or side-by-side with a log, such as log storage 808.

When data for a volume is moved from a log storage of a primary node to being stored in additional storage of remaining nodes of a data storage system, the data for the volume may be removed from a log of a node storage and an index of the node storage may be updated to indicate the new location at which the data for the volume is stored. For example, in FIG. 8B, index information 812 indicates that data for volume 1, offset A, length B is now stored at additional storage, offset X and data for volume 2, offset E, length F is now stored at additional storage, offset Y. Note that the labels "additional storage" are used for ease of illustration. In some embodiments, an index may include addresses of specific remaining nodes where the data for the volume is located, such as local IP addresses of the remaining nodes, and addresses of the columns of the storage devices within the remaining nodes.

When a read request is received by a node designated as a primary node for a volume, the node may consult an index of a log storage of the node, such as index 806 of storage 804, to determine what is the latest version of the volume's data and where the latest version of the volume's data is stored. For example a primary node, such as node 802, may consult the primary node's index, such as index 806, to determine if the latest version of the volume's data is stored in the node's log, such as log 808, or is stored in additional storage of remaining ones of the nodes of the data storage system.

FIG. 9 is a block diagram illustrating a provider network 900 that includes multiple network-based services such as a block-based storage service that includes data storage systems that implement uneven drive wear reduction, according to some embodiments. Provider network 900 may be set up by an entity such as a company or a public sector organization to provide one or more services (such as various types of cloud-based computing or storage) accessible via the Internet and/or other networks to customers 910. Provider network 900 may be a cloud provider network (sometimes referred to simply as a "cloud"), which refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Customers 910 may access these various services offered by provider network 900 via network 970. Likewise network-based services may themselves communicate and/or make use of one another to provide different services. For example, computing resources offered to customers 910 in units called "instances," such as virtual or physical compute instances, may make use of particular data volumes 926, providing virtual block-based storage for the compute instances. Also, note that any of the data storage units 924a, 924b, 924n may be data storage systems such as data storage system 102 illustrated and described in FIGS. 1-5. Also block-based storage service 920 may be a data storage service, such as data storage service 604 illustrated in FIG. 6.

As noted above, virtual compute service 940 may offer various compute instances, such as compute instances 954a and 954b to customers 910. A virtual compute instance may, for example, comprise one or more virtual servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 940 in different embodiments, including special purpose computer servers, storage devices, network devices and the like. In some embodiments instance customers 910 or any other user may be configured (and/or authorized) to direct network traffic to a compute instance. In various embodiments, compute instances may mount, connect, attach or map to one or more data volumes 926 provided by block-based storage service 920 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing customer applications, without for example requiring the customer 910 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

As illustrated in FIG. 9, a virtualization host, such as virtualization hosts 942a and 942n, may implement and/or manage multiple compute instances 952a, 952b, 954a, and 954b respectively, in some embodiments, and may be one or more computing devices, such as computing device 1000 described below with regard to FIG. 10. Virtualization hosts 942 may also provide multi-tenant hosting of compute instances. For example, in some embodiments, one virtualization host may host a compute instance for one entity (e.g., a particular customer or account of virtual computing service 910), while another compute instance hosted at the same virtualization host may be hosted for another entity (e.g., a different account). A virtualization host may include a virtualization management module, such as virtualization management modules 944a and 944b capable of instantiating and managing a number of different customer-accessible virtual machines or compute instances. The virtualization management module may include, for example, a hypervisor and an administrative instance of an operating system, which may be termed a "domain-zero" or "dom0" operating system in some implementations. The dom0 operating system may not be accessible by customers on whose behalf the compute instances run, but may instead be responsible for various administrative or control-plane operations of the network provider, including handling the network traffic directed to or from the compute instances.

Virtual computing service 940 may implement control plane 950 to perform various management operations. For instance, control plane 950 may implement resource management to place compute instances, and manage the access to, capacity of, mappings to, and other control or direction of compute instances offered by provider network. Control plane 950 may also offer and/or implement a flexible set of resource reservation, control and access interfaces for customers 910 via an interface (e.g., API). For example, control plane 950 may provide credentials or permissions to customers 910 such that compute instance control operations/interactions between customers and in-use computing resources may be performed.

In various embodiments, control plane 950 may track the consumption of various computing instances consumed for different virtual computer resources, customers, user accounts, and/or specific instances. In at least some embodiments, control plane 950 may implement various administrative actions to stop, heal, manage, or otherwise respond to various different scenarios in the fleet of virtualization hosts 942 and instances 952, 954. Control plane 950 may also provide access to various metric data for customer(s) 910 as well as manage customer configured alarms.

In various embodiments, provider network 900 may also implement block-based storage service 920 for performing storage operations. In some embodiments, block based storage service 920 may be implemented using data storage systems that support uneven drive wear reduction such as data storage system 102 illustrated and described in FIGS. 1-5. Also block-based storage service 920 may be a data storage service, such as data storage service 604 illustrated in FIG. 6.

Block-based storage service 920 is implemented using data storage systems, composed of one or more computing devices implementing a zonal control plane 930 and a pool of multiple data storage units 924a, 924b through 924n (e.g., data storage units such as data storage system 102 illustrated in FIGS. 1A-1D), which provide block level storage for storing one or more sets of data volume(s) 926a, 926b through 926n. Data volumes 926 may be attached, mounted, mapped, or otherwise connected to particular clients (e.g., a virtual compute instance of virtual compute service 940), providing virtual block-based storage (e.g., hard disk storage or other persistent storage) as a contiguous set of logical blocks. In some embodiments, a data volume 926 may be divided up into multiple data chunks or partitions (including one or more data blocks) for performing other block storage operations, such as snapshot operations or replication operations. A volume snapshot of a data volume 926 may be a fixed point-in-time representation of the state of the data volume 926. In some embodiments, volume snapshots may be stored remotely from a data storage unit 924 maintaining a data volume, such as in another storage service 960. Snapshot operations may be performed to send, copy, and/or otherwise preserve the snapshot of a given data volume in another storage location, such as a remote snapshot data store in other storage service 960. In some embodiments, a block-based storage service, such as block-based storage service 920, may store snapshots of data volumes stored in the block-based storage service.

Block-based storage service 920 may implement zonal control plane 930 to assist in the operation of block-based storage service 920. In various embodiments, zonal control plane 930 assists in creating volumes on data storage units 924a, 924b, through 924n and moving volumes between data storage units 924a, 924b, through 924n. In some embodiments, access to data volumes 926 may be provided over an internal network within provider network 900 or externally via network 970, in response to block data transaction instructions.

Zonal control plane 930 may provide a variety of services related to providing block level storage functionality, including the management of user accounts (e.g., creation, deletion, billing, collection of payment, etc.). Zonal control plane 930 may implement capacity management, which may generate and manage a capacity model for storage service 920, and may direct the creation of new volumes on particular data storage units based on the capacity of storage service 920. Zonal control plane 930 may further provide services related to the creation and deletion of data volumes 926 in response to configuration requests. Also, zonal control plane may further provide services during a re-build or reorganization of a data storage unit, such as redirecting reads and writes to a replica of the volume being implemented on another data storage system. Also, in some embodiments, a zonal control plane may assign data drives to function as log storages or additional storage, such as described in FIG. 3. Also the zonal control plane may initiate a rebuild or reorganization of a data storage system if one or more trigger criteria are met, such as described in FIG. 2. In some embodiments, data storage service control plane 606 as described in FIG. 6 may include the functionality as described for zonal control plane 930 in FIG. 9, and vice-versa.

Customers 910 may encompass any type of customer configured to submit requests to network provider 900. For example, a given customer 910 may include a suitable version of a web browser, or may include a plug-in module or other type of code module configured to execute as an extension to or within an execution environment provided by a web browser. Alternatively, a customer 910 may encompass an application such as a database application (or user interface thereof), a media application, an office application or any other application that may make use of compute instances, a data volume 926, or other network-based service in provider network 900 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, customers 910 may be configured to generate network-based services requests according to a Representational State Transfer (REST)-style network-based services architecture, a document- or message-based network-based services architecture, or another suitable network-based services architecture. In some embodiments, a customer 910 (e.g., a computational client) may be configured to provide access to a compute instance or data volume 926 in a manner that is transparent to applications implemented on the customer 910 utilizing computational resources provided by the compute instance or block storage provided by the data volume 926.

Customers 910 may convey network-based services requests to provider network 900 via external network 970. In various embodiments, external network 970 may encompass any suitable combination of networking hardware and protocols necessary to establish network-based communications between customers 910 and provider network 900. For example, a network 970 may generally encompass the various telecommunications networks and service providers that collectively implement the Internet. A network 970 may also include private networks such as local area networks (LANs) or wide area networks (WANs) as well as public or private wireless networks. For example, both a given customer 910 and provider network 900 may be respectively provisioned within enterprises having their own internal networks. In such an embodiment, a network 970 may include the hardware (e.g., modems, routers, switches, load balancers, proxy servers, etc.) and software (e.g., protocol stacks, accounting software, firewall/security software, etc.) necessary to establish a networking link between given customer 910 and the Internet as well as between the Internet and provider network 900. It is noted that in some embodiments, customers 910 may communicate with provider network 900 using a private network rather than the public Internet.

In some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like.

Example Computer System

Figure 10:
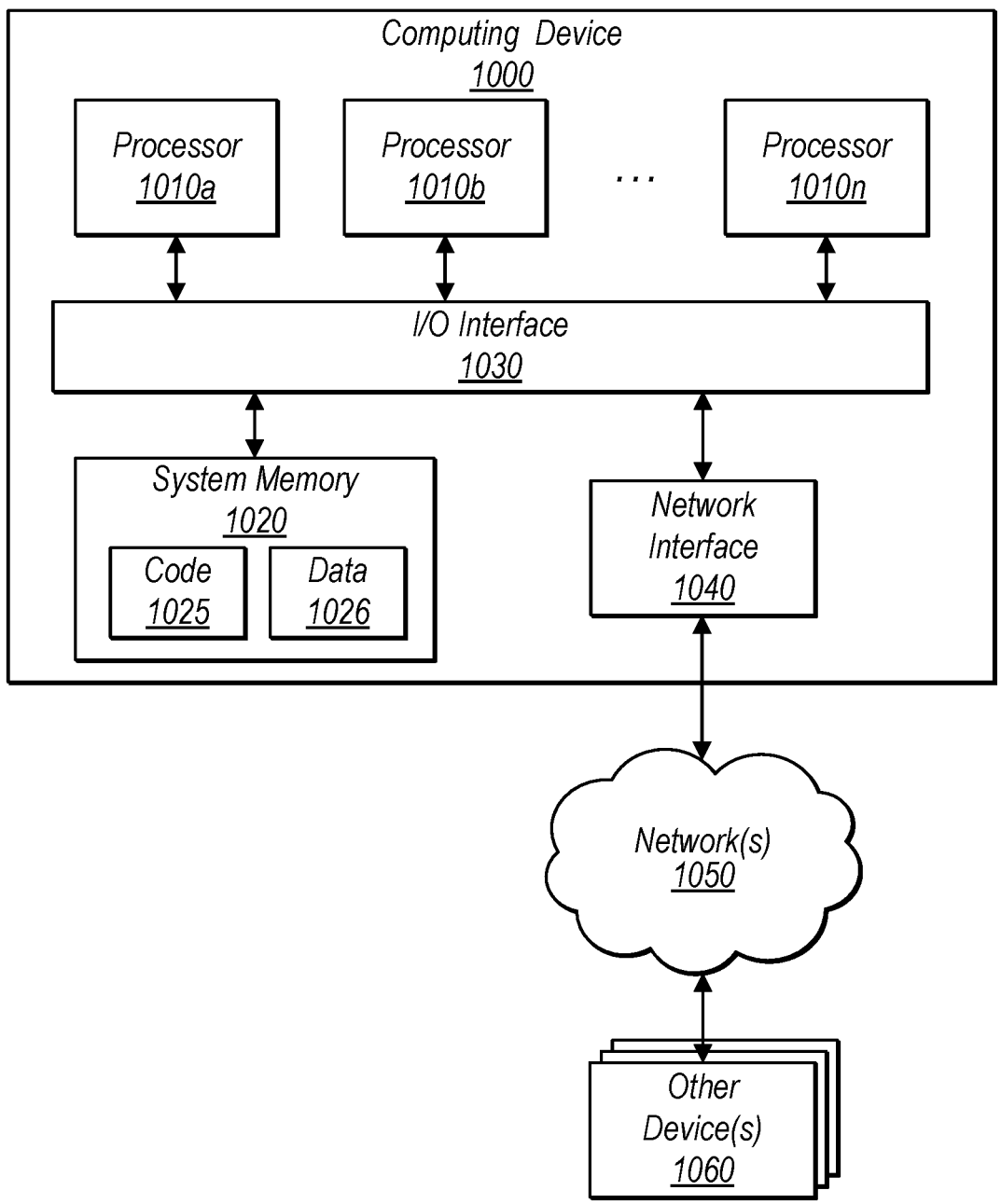
FIG. 10 is a block diagram illustrating an example computing system, according to some embodiments.

FIG. 10 is a block diagram illustrating an example computer system, according to various embodiments. For example, computer system 1000 may be configured to implement data storage device/data drive and/or controller of a data storage unit, a control plane of a data storage service, a health monitoring service of a provider network, other data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage unit head node, and persistent storage 1060 may include the SSDs that include extents allocated to that head node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory).

System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a storage node, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example.

Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Ethernet, Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to customers as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A data storage system, comprising:
   multiple data storage devices; and
   a controller configured to:
      cause at least a first data storage device of the data storage devices to host a log storage for a volume stored by the data storage system;
      cause at least a second data storage device of the data storage devices to host additional data storage for the volume, the additional storage for data flushed from the log storage;
         wherein read and write operations directed at the volume are received at the first data storage device that hosts the log storage;
      receive information indicating respective levels of wear of the first data storage device used to implement the log storage and the second data storage device used to implement the additional data storage for the volume;
      determine that a wear trigger has been met; and
      in response to determining that the wear trigger has been met, perform a reorganization of the data storage system, wherein the reorganization includes selecting particular ones of the data storage devices to host the log storage for the volume and the additional data storage for the volume, based on reducing discrepancies in levels of wear between the data storage devices of the data storage system.

2. The data storage system of claim 1, wherein the data storage system comprises:
   hardware monitoring modules configured to:
      collect usage information for the data storage devices of the data storage system; and
      provide the collected usage information to a monitoring service, wherein the received information indicating the respective levels of wear of the data storage devices of the data storage system is received from the monitoring service.

3. The data storage system of claim 1, wherein the data storage system comprises:
   hardware monitoring modules configured to:
      collect usage information for the data storage devices of the data storage system; and
      provide the collected usage information to a tracking module implemented via one or more computing devices of the data storage system, wherein the information indicating the respective levels of wear of the data storage devices of the data storage system is received from the tracking module of the data storage system.

4. The data storage system of claim 1, wherein the controller is configured to:
   cause at least two of the data storage devices to host at least two log storages for the volume,
   wherein a first one of the at least two data storage devices hosts a primary log storage for the volume and a second one of the at least two data storage devices hosts a secondary log storage for the volume,
   wherein the data storage device hosting the primary log storage for the volume is configured to:
      receive a write request directed at the volume;
      store write data associated with the write request in the primary log storage;
      cause the write data to be replicated to the secondary log storage hosted on another one of the at least two data storage devices; and
      cause the write data to be flushed to the additional data storage hosted on respective ones of the remaining data storage devices of the data storage system.

5. The data storage system of claim 1, wherein the controller is configured to:
   cause at least two of the data storage devices to host at least two log storages for the volume,
   wherein a first one of the at least two data storage devices hosts a primary log storage for the volume and a second one of the at least two data storage devices hosts a secondary log storage for the volume,
   wherein the data storage device hosting the primary log storage for the volume is configured to:
      receive a read request directed to the volume;
      read data requested by the read request from the primary log storage; or
      retrieve the requested data from the additional data storage hosted on the respective ones of the remaining data storage devices of the data storage system, if the data requested by the read request is not stored in the primary log storage; and
      provide the data requested by the read request.

6. A method of storing a volume on a data storage system comprising multiple data storage devices, comprising:
   hosting a log storage for the volume stored using at least a first of the data storage devices;
   hosting additional data storage for the volume using at least a second of the data storage devices of the data storage system;
   determining that a wear trigger has been met; and
   in response to determining that the wear trigger has been met, reorganizing which particular ones of the data storage devices host the log storage and the additional data storage based on reducing discrepancies in respective levels of wear of the data storage devices.

7. The method of claim 6, further comprising:
receiving a read request or a write request directed at the volume; and
servicing the read request or the write request via the log storage,
wherein write data included with the write request is stored to the log storage and subsequently flushed to the additional data storage for the volume; or
wherein data requested by the read request is read from the log storage or retrieved from the additional data storage, if already flushed from the log storage.

8. The method of claim 6, wherein the wear trigger comprises:
a deviation between levels of wear of the respective data storage devices of the data storage system being greater than a threshold amount of wear deviation.

9. The method of claim 6, wherein the wear trigger comprises:
a level of wear of one or more of the data storage devices hosting one or more log storages exceeding a threshold amount of wear.

10. The method of claim 6, further comprising:
prior to said reorganizing,
transitioning incoming write requests to another data storage system of a provider network;
transferring volume data for the volume stored in the additional data storage and stored in the log storage to the other data storage system of the provider network; and
redirecting incoming read requests for the volume to the other data storage system of the provider network;
installing one or more software update packages on a computing device of the data storage system;
implementing the log storage for the volume using one or more of the data storage devices selected as part of the reorganization; and
implementing the additional data storage for the volume on remaining ones of the data storage devices selected as part of the reorganization.

11. The method of claim 10, wherein the reorganization is part of a rebuild process for the data storage system,
wherein software instructions for determining the wear trigger and software instructions for performing said reorganizing are provided to the data storage system as part of a software update package to be installed during the rebuild process.

12. The method of claim 6, further comprising:
providing usage information for the data storage devices of the data storage system to a wear tracking service via one or more hardware monitoring modules implemented at the data storage system; and
receiving from the wear tracking service information indicating respective levels of wear of the data storage devices of the data storage system.

13. The method of claim 12, wherein the tracking service is implemented via one or more computing devices of the data storage system.

14. The method of claim 12, wherein the tracking service is implemented via a separate service of a service provider network that also includes the data storage system, wherein the separate service is configured to:
receive the usage information from the hardware monitoring modules of the data storage system; and
provide the information indicating the respective levels of wear of the data storage devices of the data storage system.

15. The method of claim 6, wherein a given data storage device selected to host the log storage as part of performing a reorganization is selected based on being the data storage device with a least amount of wear as compared to the other data storage devices of the data storage system.

16. The method of claim 6, wherein a given data storage device selected to host the log storage as part of performing a reorganization is randomly selected from the data storage devices of the data storage system that previously were not used to implement the log storage prior to the reorganization.

17. The method of claim 6, further comprising:
selecting the first data storage device to host the log storage for the volume as part of an initial placement of the volume in the data storage system,
wherein the first data storage device is selected based on the respective levels of wear of the storage devices of the data storage system such that discrepancies in the levels of wear between the storage devices are reduced.

18. One or more non-transitory, computer-readable storage media, storing program instructions that, when executed on or across one or more computing devices, cause the one or more computing devices to:
cause a log storage to be implemented for a volume stored by a data storage system using at least one of a plurality of data storage devices of the data storage system;
cause additional data storage for the volume to be implemented using remaining ones of the data storage devices of the data storage system;
determine a wear trigger has been met; and
in response to determining that the wear trigger has been met, reorganize which particular ones of the data storage devices implement the log storage and the additional data storage based on reducing discrepancies in respective levels of wear of the data storage devices.

19. The one or more non-transitory computer-readable media of claim 18, wherein the wear trigger comprises:
a deviation between levels of wear of the respective data storage devices of the data storage system being greater than a threshold amount of wear deviation.

20. The one or more non-transitory computer-readable media of claim 18, wherein the wear trigger comprises:
a number of operations that have been performed by the data storage device implementing the log storage since a most recent reorganization was performed exceeding a threshold number of operations.

* * * * *